United States Patent

[11] 3,590,744

| [72] | Inventors | Roderick S. Galloway<br>Chalfont;<br>Horace M. Swartz, Doylestown; Joseph H. Walsh, Doylestown, all of, Pa. |
|---|---|---|
| [21] | Appl. No. | 766,425 |
| [22] | Filed | Oct. 10, 1968 |
| [45] | Patented | July 6, 1971 |
| [73] | Assignee | FMC Corporation<br>San Jose, Calif. |

[54] LOW PROFILE CHAIN FOR FLOOR CONVEYOR SYSTEMS
13 Claims, 1 Drawing Fig.

| [52] | U.S. Cl. | 104/172 |
|---|---|---|
| [51] | Int. Cl. | B65g 17/38 |
| [50] | Field of Search | 104/165, 172; 198/173, 177 |

[56] References Cited
UNITED STATES PATENTS

| 3,389,662 | 6/1968 | Jacoby | 104/172 |
|---|---|---|---|
| 3,390,641 | 7/1968 | Jacoby | 104/172 |
| 3,461,812 | 8/1969 | Roland | 104/172 |

Primary Examiner—Arthur L. LaPoint
Assistant Examiner—Robert W. Saifer
Attorneys—F. W. Anderson and C. E. Tripp ABSTRACT: A conveyor chain adapted for use in a floor-mounted chain guide to engage the tow pin of a truck and move the latter. The chain includes a plurality of links and at least one pusher member, the links and the member being interconnected for relative angular and longitudinal movement. Structure is provided on the links presenting a substantially longitudinally continuous pin-supporting surface on the chain to prevent driving engagement between the tow pin and the chain except at the pusher member.

PATENTED JUL 6 1971
3,590,744
SHEET 1 OF 4
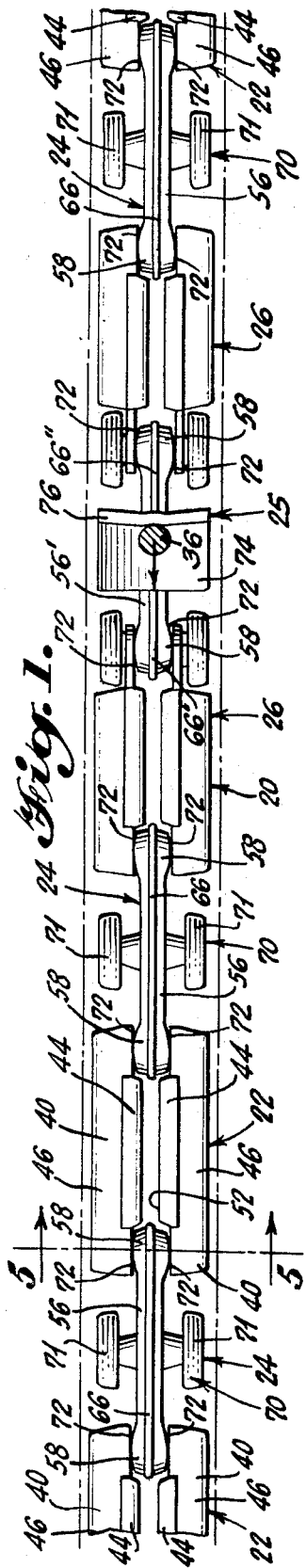
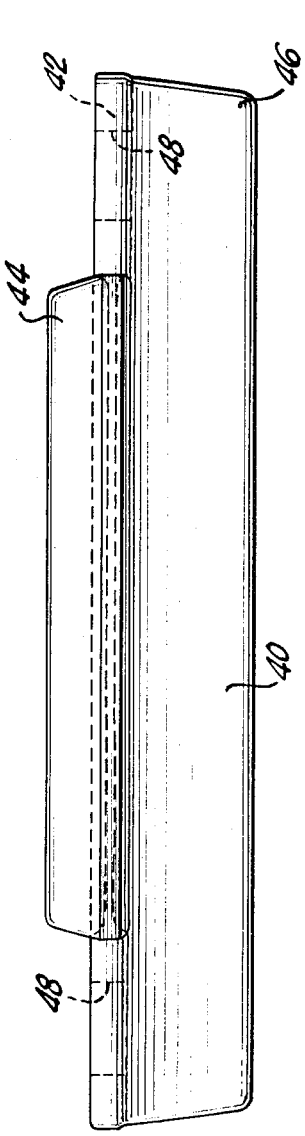
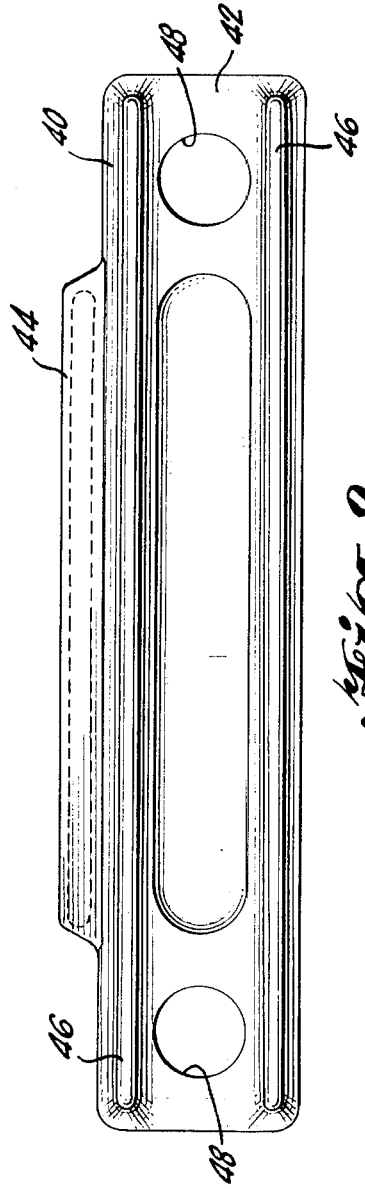
INVENTORS
RODERICK S. GALLOWAY,
HORACE M. SWARTZ,
JOSEPH H. WALSH
BY
Francis W. Anderson
Charles E. Triggs
ATTORNEYS

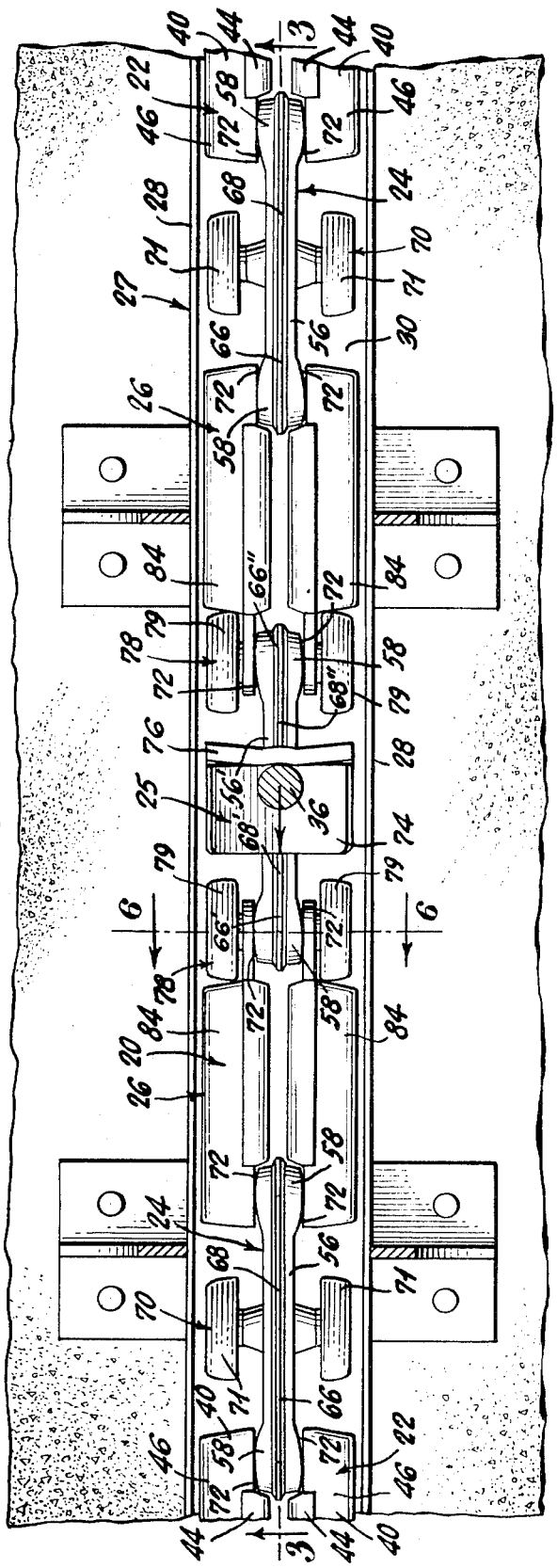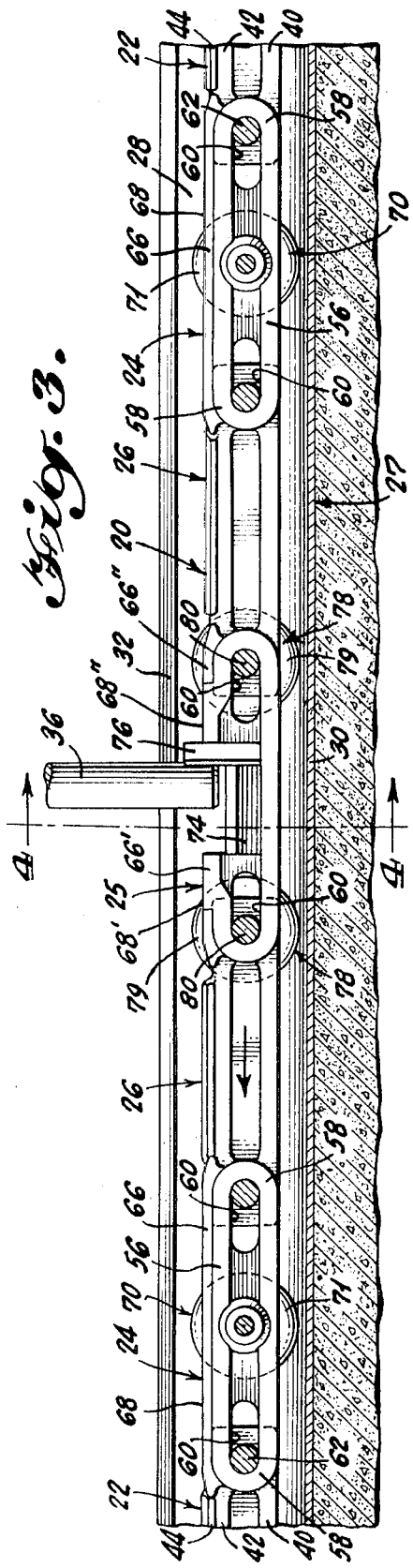

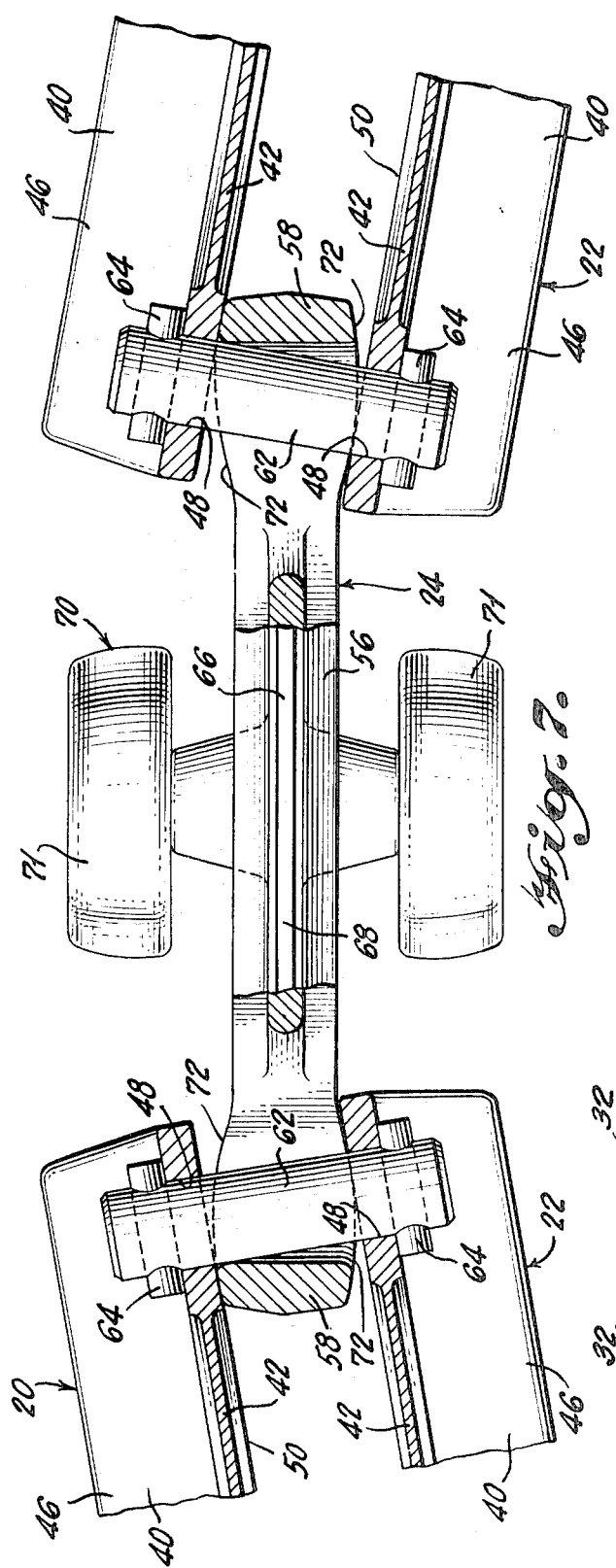
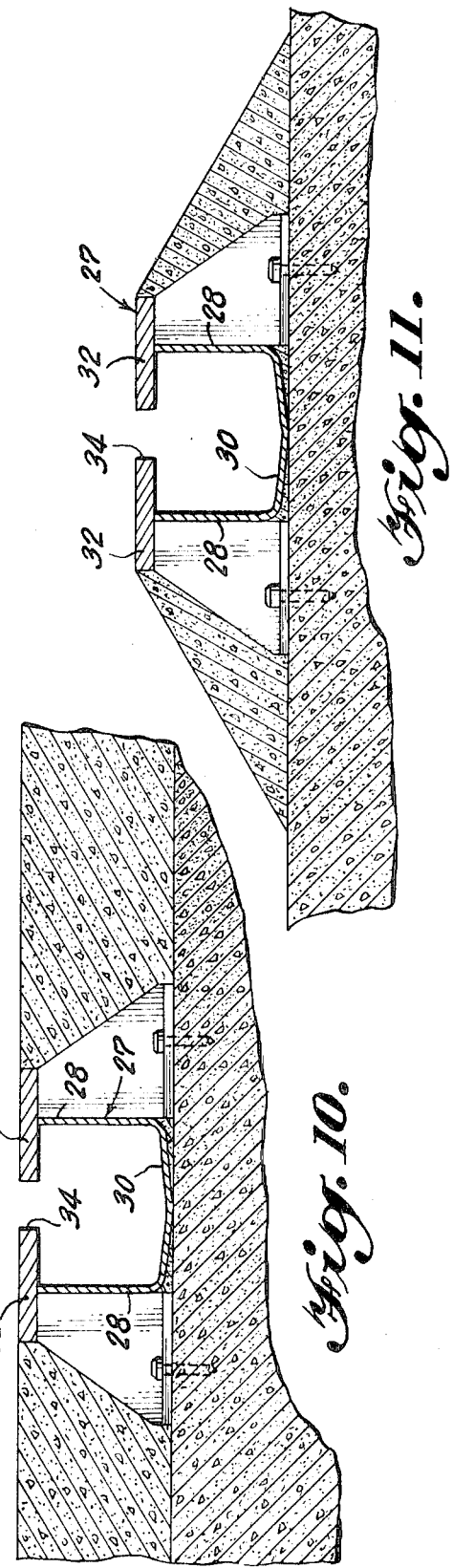

3,590,744

LOW PROFILE CHAIN FOR FLOOR CONVEYOR SYSTEMS

BACKGROUND OF THE INVENTION

1. Field of the Invention

The present invention relates generally to conveyor chains and more particularly relates to such chains which are adapted for operation in a floor-mounted chain guide to provide motive means for warehouse trucks and the like.

2. Description of the Prior Art

Floor-mounted conveyor chains for towed warehouse trucks and the like have become very popular in the materials-handling field. Generally, such chains have been made up of a plurality of interconnected links including spaced pusher members disposed to drivingly engage a tow pin depending from a truck. Maintenance and operational problems can arise when the pins become engaged with the chain at a position other than the pusher member. That is to say, the entrance of the pin into the chain at an improper location can cause jamming of the chain. Further, most of the prior-art chain constructions for towed truck installations require an undesirably deep chain guide in the warehouse floor which adds to installation costs and limits the range of applications for such conveyor systems.

SUMMARY OF THE INVENTION

The instant invention is aimed at alleviating the above-stated problems. In this regard, it is an object of the invention to provide a conveyor chain which will not become engaged with a tow pin except at the pusher members. Further, an important object is to provide a low profile or shallow depth chain capable of the required freedom of articulation between links to maneuver turns in the tow path and be easily assembled and disassembled for installation and repair. These objects, aims and purposes are accomplished through the use of a chain construction which will support a tow pin during movement of the chain therebeneath to preclude penetration of the pin into the links of the chain, is easily assembled and has a minimum vertical height to be received in a shallow floor embedded chain guide.

Broadly, the chain of the invention includes a subassembly which comprises first and second elongated links. The links are disposed in substantial end-to-end relationship and pivot means are provided to interconnect the links for relative angular and longitudinal movement. Each link is provided with an elongated structure thereon, each structure presenting an outer face which extends longitudinally of the corresponding link. The upper faces of the links are substantially coplanar and the structures are disposed out of substantial longitudinal alignment to permit relative movement of the links while the faces normally present a substantially longitudinally continuous surface for supporting a tow pin as the chain moves relatively therebeneath.

BRIEF DESCRIPTION OF THE DRAWINGS

FIG. 1 is a top plan view of a conveyor chain constructed in accordance with the present invention;

FIG. 2 is an enlarged top plan view of a portion of the chain of FIG. 1;

FIG. 3 is a cross-sectional view taken substantially along line 3-3 of FIG. 2;

FIG. 7 is an enlarged top plan view of a portion of the chain, certain parts being shown in section for increased clarity;

FIG. 9 is a side elevational view of the link member of FIG. 8; and

FIGS. 10 and 11 are similar, vertical, cross-sectional views illustrating two different ways for installing a chain guide to accommodate the chain of this invention.

DESCRIPTION OF THE PREFERRED EMBODIMENT

Figure 4:
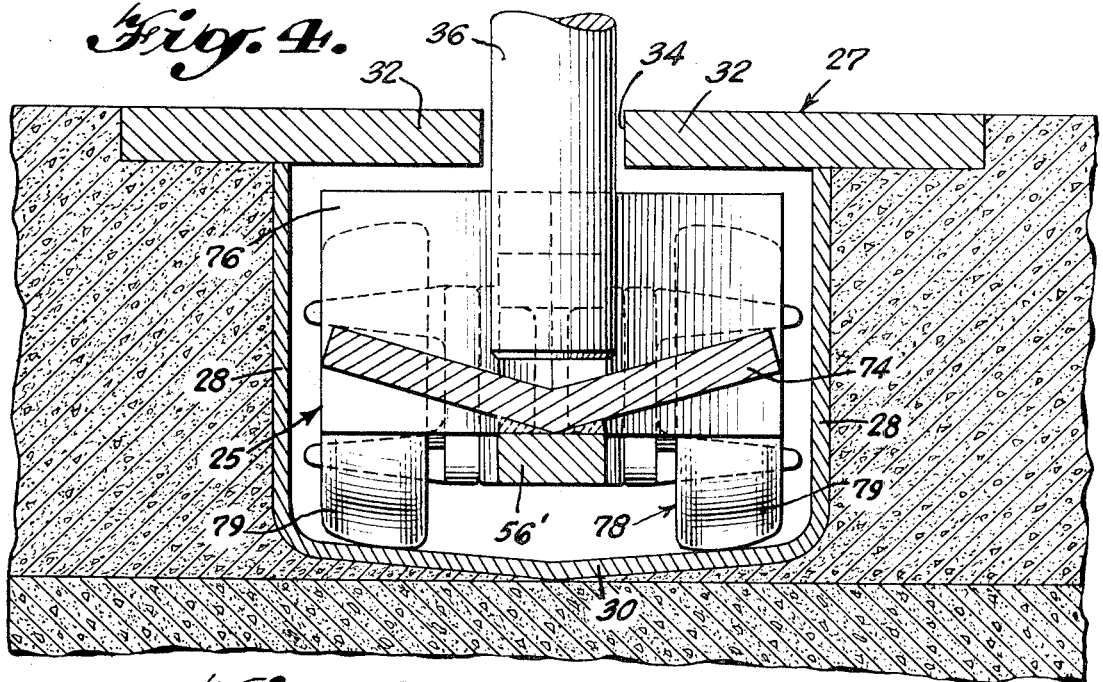
FIG. 4 is an enlarged cross-sectional view taken substantially along line 4-4 of FIG. 3.

A conveyor chain which embodies the concepts and principles of the instant invention is illustrated in the drawings and is broadly designated by the numeral 20. Chain 20 comprises a plurality of outside links 22 and a plurality of inside links 24. The links 22 and 24 are elongated and are disposed alternately in end-to-end relationship as best illustrated in FIG. 1. Chain 20 also includes at least one pusher link 25, which is similar to the inside links 24, and a pair of adapter links 26 which are similar to the outside links 22. The adapter links 26 are disposed on opposite sides of the opposed ends of pusher link 25.

Chain 20 is continuous and is adapted for being driven in a conventional manner by a prime mover means (not shown) through a chain guide 27 which comprises a pair of opposed vertical spaced sidewalls 28, a bottom wall 30 extending horizontally between walls 28, and a pair of upper, horizontal wall members 32 which are horizontally spaced to present a slotted track 34 therebetween. Track 34 is disposed to receive a depending vertical tow pin 36 of a warehouse truck or the like (not shown) and pusher link 25 is positioned in chain guide 27 to drivingly engage pin 36 to move the truck along with chain 20. It is to be noted that guide 27 may be installed above grade as shown in FIG. 11; however, it is preferably installed below grade as shown in FIG. 10.

Figure 5:
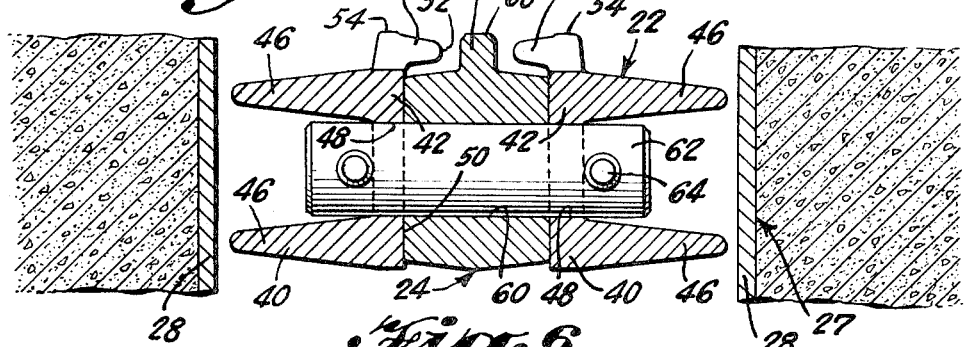
FIG. 5 is an enlarged cross-sectional view taken substantially along line 5-5 of FIG. 1.

Each outside link 22 is comprised of a pair of laterally spaced members 40 which overlap the end of an inside link 24 or of a pusher link 25 in the assembled chain. As shown in FIGS. 5, 8 and 9, each member 40 has a vertically disposed sidewall portion 42 and a horizontally projecting flange 44 disposed at the upper edge of portion 42 presenting a generally L-shaped cross-sectional configuration. Each member 40 is also provided with a pair of wing portions 46 which extend laterally from adjacent the upper and lower edges of wall portion 42 in the opposite direction from flange 44. Portion 42 has a hole 48 extending therethrough at each of its ends.

In the assembled chain the members 40 of each link 22 are horizontally spaced with their portions 42 disposed in substantially parallel relationship presenting a channel 50 therebetween. The flanges 44 of the members 40 which make up each link 22 extend toward one another presenting a slot 52 therebetween. Slot 52 and channel 50 extend longitudinally of link 22 with slot 52 being in communication with channel 50. As can best be seen in FIG. 5, flanges 44 have upper faces 54 which extend longitudinally of link 22 adjacent slot 52. The flanges 44, thus present an elongated structure which extends longitudinally of link 22.

Each link 24 includes a central portion 56 and a pair of end portions 58. The end portions 58 are wider than portion 56 as can best be seen in FIG. 7. A hole 60 extends through each end portion 58, the holes 60 being elongated in a direction longitudinally of link 24. In the assembled chain the ends 50 of links 24 are received within the ends of the channels 50 of adjoining links 22. Thus, each hole 60 of link 24 is aligned between opposed holes 48 of an adjoining link 22. A pin 62 extends through the aligned pair of holes 48 and through the hole 60 in link 24 therebetween. Keepers 64 pressed into bores adjacent the opposite ends of pin 62 lock each pin 62 in place.

Each link 24 is provided with an elongated structure defined by a rib 66 which extends substantially the entire length of its link 24 and presents an upper face 68. Viewing FIG. 5, it can be seen that when the end of link 24 is disposed within channel particularly important that the ribs 66 are longitudinally aligned with the slots 52 in the adjoining links 22. That is to say, ribs 66 of the links 24 are out of longitudinal alignment with the flanges 44 of adjoining links 22.

Links 24 may be provided with antifriction support means in the nature of a set 70 of wheels 71. The wheels 71 are adapted for rolling engagement with the bottom wall 30 of guide 27 and are suitably mounted on an axle supported on central portion 56 of link 24. It is to be noted that the wing portions 46 of links 22 preferrably extend laterally from the centerline of the chain for a sufficient distance such that they will engage the sidewalls of guide 27 before wheels 71 and thus prevent binding of wheels 71 against sidewalls 28 of guide 27. This relationship of the overall width of links 22 to the outer ends of wheels 71 is especially important where the chain is being drawn and around a curved section of the chain guide 27.

While all of the links 24 of chain 20 are shown as having wheels 71, this is not essential. In practice inside links without wheels could be utilized. A completely suitable arrangement can have wheels only on every other inside link.

Adjoining links 24 and 22 are relatively pivotable in a plane normal to the horizontal axis of the pin 62 which interconnects the same. Also, as can be seen viewing FIG. 7, adjacent links 22 and 24 are relatively pivotable in a plane including the axis of pin 62. This latter pivotal movement is accommodated by the longitudinal length of the hole 60 relative to the diameter of pin 62. That is to say, the pin 62 is shiftable in a horizontal plane relative to link 24. The ends 58 of links 24 are provided with arcuate lateral surfaces 72 which permit and guide this relative horizontal pivoting of links 22 and 24.

In addition links 22 and 24 are relatively movable in a longitudinal direction so that the chain is collapsible. This movement is also permitted by the longitudinal elongation of the holes 60 of links 24. Hence, the holes 48 and 60 and the pins 62 present pivot means which interconnects links 22 and 24 for relative angular and longitudinal movement. These movements, and in particular the relative longitudinal movement of links 22 and 24, are further accommodated because of the ribs 66 on links 24 are disposed in substantial longitudinal alignment with the slots 52 of adjoining links 22.

As mentioned previously, the upper faces 68 of the ribs 66 are substantially coplanar with the faces 54 of the flanges 44. Further, as can be seen viewing FIG. 1, the ends of the ribs 66 coincide substantially with the ends of the flanges 44. Thus, the faces 68 and 54 present a longitudinally extending surface which is substantially continuous.

The pusher link 25 is similar in many respects to the inside links 24. That is to say, link 25 has a central portion 56' and a pair of end portions 58 which are wider than the central portion 56'. Also, link 25 is provided with longitudinally elongated holes 60 and arcuate surfaces 72 to permit angular and longitudinal movement of pusher link 25 relative to adapter links 26. A section of the central portion 56' of link 25 is cut away to enable mounting a transversely V-shaped base plate 74 and an upright pusher wall 76. As can best be seen viewing FIG. 4, wall 76 is disposed for engaging a pin 36 depending through slotted track 34. Link 25 is also provided with rib portions 66' and 66'' at opposite ends thereof. Portions 66' and 66'' present upper faces 68' and 68''.

Figure 6:
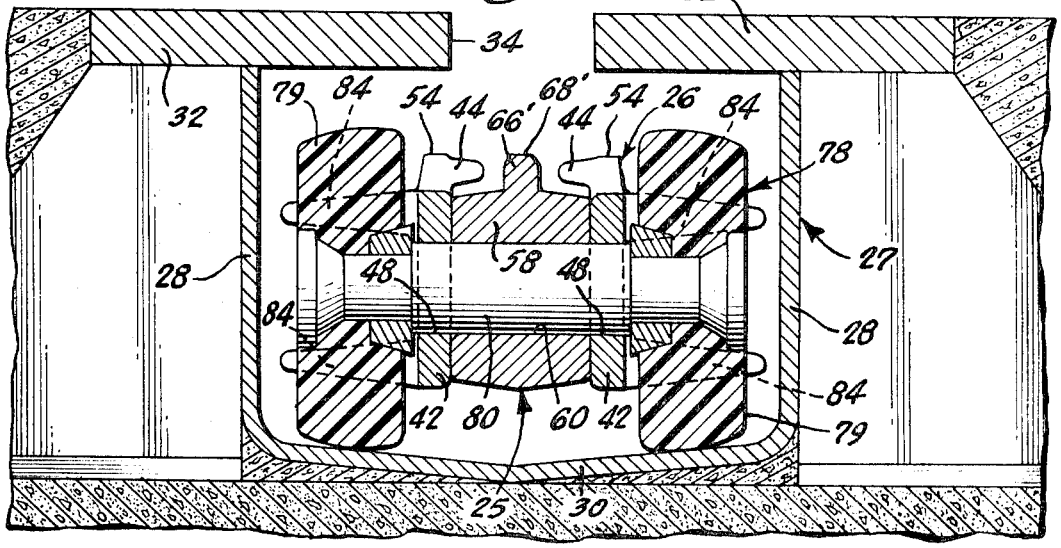
FIG. 6 is an enlarged cross-sectional view taken substantially along line 6-6 of FIG. 2.

Because of the extra stresses and loads on chain 20 at the locations of each pusher link 25 such as applied by the tow pin 36, the pusher link is preferably provided with a set 78 of wheels 79 at each of its ends. For this purpose, axle pins 80 are provided. Pins 80 are elongated laterally of chain 20 to provide means for rotatably mounting the wheels 79 as can best be seen viewing FIG. 6. Also, it is to be noted that the adapter links 26 adjacent pusher link 25 are slightly modified as compared with the normal outside links 22 in that the wind portions 84 of links 26 are shortened to provide operating room for wheels 79. In all other respects, the links 26 are identical with links 22 and they have sidewall portions 42, flanges 44, upper faces 54 and holes 48. Thus, the faces 68 of links 24, the faces 54 of links 22, the faces 68' and 68'' of links 25 and the faces 54 of links 26 present a longitudinally extending upper surface on chain 20 which is interrupted only by depressed plate 74 and wall 76 of pusher link 25.

The opposed edges of the faces 54 of each link 22 and 26 are spaced closer than the diameter of the pin 36 to slidably support pin 36 and permit movement of chain 20 relative to the pin. That is to say, pin 36 will be supported by the faces 68, 68', 68'' or 54, as the case may be, as the chain 20 moves through guide 27. This will prevent engagement between chain 20 and pin 36 except at a pusher link 25. Thus, jamming of chain 20 by an improperly positioned or engaged pin 36 is substantially precluded. Although chain 20 has been described as having only a single pusher link 25, in practice each length of chain 20 will normally be provided with a plurality of longitudinally spaced pusher links 25.

Having thus described in detail a preferred apparatus which embodies the concepts and principles of the invention and which accomplishes the various objects, purposes and aims thereof, it is to be appreciated and will be apparent to those skilled in the art, that many physical changes could be made in the chain without altering the inventive concepts and principles embodied therein. Hence, it is intended that the scope of the invention be limited only to the extent indicated in the appended claims.

We claim:

1. In a conveyor chain, a first elongated link having a channel extending longitudinally inwardly from one end thereof, and having an upwardly opening slot extending longitudinally of the link in communication with the channel; a second elongated link, said links being disposed in substantial end-to-end relationship with one end of the second link being received within said channel, pivot means interconnecting the links for relative angular and longitudinal movement therebetween and elongated structure on each link presenting an upper face extending longitudinally of the corresponding link, said faces being substantially coplanar, said structures being disposed out of substantial alignment to permit relative movement of the links while said faces normally present a substantially longitudinally continuous surface, said elongated structure of the first link being disposed adjacent the slot, and said elongated structure on the second link, comprising a rib, being disposed in substantial longitudinal alignment with the slot.

2. In a conveyor chain, a first elongated link having a channel extending longitudinally inwardly from one end thereof and having an upwardly opening slot extending longitudinally of the link in communication with the channel; a second elongated link, said links being disposed in substantial end-to-end relationship with one end of the second link being received within said channel; pivot means interconnecting the links for relative angular and longitudinal movement therebetween; and an elongated structure on each link presenting an upper face extending longitudinally of the corresponding link, said faces being substantially coplanar, said structures being disposed out of substantial longitudinal alignment to permit relative movement of the links while said faces normally present a substantially longitudinally continuous surface, said elongated structure on the first link being disposed adjacent the slot and comprising a pair of flanges extending longitudinally of the link in substantial parallelism, said flanges being spaced laterally to present said slot therebetween, said elongated structure on the second link comprising a rib extending longitudinally of the link in substantial alignment with said slot.

3. In a conveyor chain, a first elongated link comprised of a pair of longitudinally extending members, each member having a sidewall portion and a lateral flange presenting a substantially L-shaped cross-sectional configuration said members being laterally spaced with the wall portions disposed in substantial parallelism defining a channel extending longitudinally of the link, said flanges extending toward one another defining a longitudinally extending slot therebetween; a second elongated link, said links being disposed in substantial end-to-end relationship with one end of the second links received between said wall portions in said channel; pivot means interconnecting the links for relative angular and longitudinal movement therebetween; and an elongated structure on each link presenting an upper face extending longitudinally of the corresponding link, said faces being substantially coplanar, said structures being disposed out of substantial longitudinal alignment to permit relative movement of the links while said faces normally present a substantially longitudinally continuous surface, said elongated structure on said second link comprising a longitudinal rib disposed in substantial longitudinal alignment with said slot.

4. The article of claim 3 wherein a hole is provided in each wall portion and a corresponding hole in the end of the second link disposed therebetween, said holes being aligned, and said pivot means comprises an elongated pin extending through the holes.

5. The article of claim 4 wherein the hole in the second link is elongated in a direction longitudinally of the link permitting relative movement of the pin angularly and longitudinally of the second link.

6. The article of claim 5 wherein wheel means is included on said second link.

7. A conveyor chain adapted for use in a chain guide defined by a bottom wall, a pair of sidewalls and a pair of spaced top wall members defining an upper slotted track therebetween disposed for receiving the tow pin of a wheeled truck, said chain comprising: a plurality of elongated first links having a channel extending longitudinally therethrough and having an upwardly opening slot extending longitudinally of the link; a plurality of elongated second links, said first and second links being disposed alternately in substantial end-to-end relationship with one end of an adjoining second link being received within each end of each channel; pivot structure connecting each link with adjoining links for relative angular and longitudinal movement therebetween; pusher means on at least one of the second links disposed for contacting a tow pin to move the truck with the chain when the latter is moved through the guide; and an elongated structure on each of the remaining links presenting an upper face extending longitudinally of the corresponding link, said faces being positioned substantially in coplanar relationship and disposed adjacent the slotted track, each structure being disposed out of substantial alignment with the structures on adjoining links to permit relative movement of the links while said faces present a substantially longitudinally continuous surface for supporting the pin to permit relative movement between the pin and chain and prevent operative engagement between the pin and chain except at said pusher means, said elongated structure of each first link being disposed adjacent its slot, said elongated structure on each second link comprising a rib extending longitudinally of the link in substantial alignment with the slots of adjoining first links.

8. A conveyor chain adapted for use in a chain guide defined by a bottom wall, a pair of sidewalls and a pair of spaced top wall members defining an upper slotted track therebetween disposed for receiving the tow pin of a wheeled truck, said chain comprising: a plurality of elongated first links having a channel extending longitudinally therethrough and having an upwardly opening slot extending longitudinally of the link in communication with its channel, a plurality of elongated second links, said first and second links being disposed alternately in substantial end-to-end relationship with one end of an adjoining second link being received within each end of 65 each channel; pivot structure connecting each link with adjoining links for relative angular and longitudinal movement therebetween; pusher means on at least one of the second links disposed for contacting a tow pin to move the truck with the chain when the latter is moved through the guide; and an elongated structure on each of the remaining links presenting an upper face extending longitudinally of the corresponding link, said faces being positioned substantially in coplanar relationship and disposed adjacent the slotted track when the chain is in the guide, each structure being disposed out of substantial alignment with the structures on adjoining links to permit relative movement of the links while said faces present a substantially longitudinally continuous surface for supporting the pin to permit relative movement between the pin and chain and prevent operative engagement between the pin and chain except at said pusher means, said elongated structure of each first link being disposed adjacent its slot and comprising a pair of flanges extending longitudinally of the link in substantial parallelism, the flanges of each first link being spaced to present said slot therebetween, said elongated structure of each second link, comprising a rib extending longitudinally of the link, being disposed in substantial longitudinal alignment with the slots of adjoining first links.

9. A conveyor chain adapted for use in a chain guide defined by a bottom wall, a pair of sidewalls and a pair of spaced top wall members defining an upper slotted track therebetween disposed for receiving the tow pin of a wheeled truck, said chain comprising: a plurality of elongated first links, each first link comprising a pair of longitudinally extending members, each member having a side wall portion and a lateral flange presenting a substantially L-shaped cross-sectional configuration, said members being laterally spaced with the wall portions disposed in substantial parallelism defining a channel extending longitudinally of the link, said flanges extending toward one another defining a longitudinally extending slot therebetween communicating with the channel, a plurality of elongated second links, said first and second links being disposed alternately in substantial end-to-end relationship with the ends of said second links being received between the corresponding wall portions of the first links in the channels, there being a longitudinal rib on each second link disposed in substantial alignment with the slots of adjoining first links; pivot structure connecting each link with adjoining links for relative angular and longitudinal movement therebetween; pusher means on at least one of the second links disposed for contacting a tow pin to move the truck with the chain when the latter is moved through the guide; and an elongated structure on each of the remaining links presenting an upper face extending longitudinally of the corresponding link, said faces being positioned substantially in coplanar relationship and disposed adjacent the slotted track when the chain is in the guide, each structure being disposed out of substantial alignment with the structures on adjoining links to permit relative movement of the links while said faces present a substantially longitudinally continuous surface for supporting the pin to permit relative movement between the pin and chain and prevent operative engagement between the pin and chain except at said pusher means.

10. The chain of claim 9 wherein a hole is provided at each end of each wall portion and a corresponding hole at each end of each second link, each of the holes of a second link being aligned with corresponding holes of a first link, said pivot means comprising an elongated pin extending through the aligned holes.

11. The chain of claim 10 wherein the holes in the second links are elongated in a direction longitudinally of the links permitting relative movement of the pins angularly and longitudinally of the second links.

12. The chain of claim 11 wherein antifriction means is included on said links.

13. The chain of claim 12 wherein said antifriction means comprises wheel means on said second links.

FO-1050
(5/69)

UNITED STATES PATENT OFFICE
CERTIFICATE OF CORRECTION

Patent No. 3,590,744     Dated July 6, 1971

Inventor(s) RODERICK S. GALLOWAY et al

It is certified that error appears in the above-identified patent and that said Letters Patent are hereby corrected as shown below:

Col. 1, line 74, insert a new paragraph
--FIG. 8 is an enlarged top plan view of one type of link member of the chain;--.

Col. 2, line 74, insert --50, the upper face 68 of link 24 is substantially coplanar with the upper faces 54 of the members 40 making up link 22. It is--.

Col. 3, line 16, delete "and"; line 71, change "wind" to --wing--.

Col. 6, line 38, after "substantial" insert --longitudinal--.

Signed and sealed this 16th day of May 1972.

(SEAL)
Attest:

EDWARD M. FLETCHER, JR.
Attesting Officer

ROBERT GOTTSCHALK
Commissioner of Patents